United States Patent [19]
Minami et al.

[11] Patent Number: 5,276,671
[45] Date of Patent: Jan. 4, 1994

[54] CONTROL APPARATUS OF LASER DIODE

[75] Inventors: Akira Minami; Shigeyoshi Tanaka, both of Kawasaki, Japan

[73] Assignee: Fujitsu Limited, Japan

[21] Appl. No.: 881,501

[22] Filed: May 11, 1992

[30] Foreign Application Priority Data

May 16, 1991 [JP] Japan ................... 3-111486

[51] Int. Cl.$^5$ .................. G11B 7/00; G11B 7/125
[52] U.S. Cl. ..................... 369/116; 369/99; 372/38; 250/205
[58] Field of Search .............. 369/99, 107, 116, 122, 369/124, 126, 54, 47; 360/61, 62; 346/76; 372/31, 38; 250/205

[56] References Cited

U.S. PATENT DOCUMENTS

| | | | |
|---|---|---|---|
| 4,685,097 | 8/1987 | van der Put | 369/122 |
| 5,119,360 | 6/1992 | Minakuchi | 369/116 |
| 5,189,650 | 2/1993 | Watanabe et al. | 369/116 |
| 5,197,059 | 3/1993 | Minami et al. | 369/116 |

FOREIGN PATENT DOCUMENTS

| | | |
|---|---|---|
| 0223576 | 5/1987 | European Pat. Off. |
| 0352125 | 1/1990 | European Pat. Off. |
| 62-129950 | 6/1987 | Japan |
| 63-140432 | 6/1988 | Japan |
| 1-220144 | 9/1989 | Japan |

Primary Examiner—Paul M. Dzierzynski
Assistant Examiner—Don Wong
Attorney, Agent, or Firm—Welsh & Katz, Ltd.

[57] ABSTRACT

A laser diode having a cathode connected to the ground side of a positive power source and an anode connected to the plus voltage side of the power source through a control circuit. A maximum current to drive the laser diode is supplied to the laser diode by a disgorging type constant current source. In a reading mode operated at a frequency one or more digit higher than a frequency for writing data, a differential current between the write current and a read current is sucked from the disgorging type constant current source by a sucking type constant current source, thereby allowing the read current to flow into the diode. In a writing mode, a current switch connects the sucking type current source according to write data. The disgorging type current source and the sucking type current source are connected to a photodiode by a current switch. An APC responds to the photodiode which detects a read power, thereby reducing a laser fluctuation created from temperature change.

28 Claims, 12 Drawing Sheets

CONTROL APPARATUS OF LASER DIODE

BACKGROUND OF THE INVENTION

The invention relates to a control apparatus of a laser diode for controlling a light emitting power of a laser beam which is irradiated from the laser diode to an optically rewritable or unwritable recording medium such as optical disk, magnetooptical disk, or the like and, more particularly, to a control apparatus of a laser diode whose light emission is driven and in which a cathode is connected to the ground side of a positive power source and an anode is connected to the plus voltage side of the positive power source through a control circuit.

In an optical recording and reproducing apparatus using an optical recording medium such as optical disk, magnetooptical disk, optical card, or the like, a laser diode is used as a light source, the light emission is controlled to a large write power in the writing or erasing mode, and the light emission is controlled to a small read power in the reading mode.

In the reading mode corresponding to a small power, a power level exists in a noise region of the laser diode and an S/N ratio of a reproduction signal deteriorates. Therefore, there is used a read modulating method such that the light emitting output is modulated so as to have a peak level exceeding a noise level at a frequency which is higher by one or more digit than a recording frequency and an execution power is suppressed within the noise region even when a peak power is high.

Further, in order to suppress a fluctuation of the light emitting power during the use of the laser diode, an automatic power control (hereinafter, abbreviated to "APC") is used, thereby controlling a light emitting power in the reading mode and a specific power (lowest power level when there is no light emission) in the writing mode to set reference values.

Generally, the laser diode has a unit structure such that it is packaged integratedly with a photodiode for monitoring. A negative power source is ordinarily used due to a diode connection in the unit.

In the field of a small disk apparatus, however, a positive power source is generally used and it is demanded that the small disk apparatus can be driven by the positive power source.

DESCRIPTION OF THE RELATED BACKGROUND ARTS

As shown in FIG. 1, a conventional laser diode which is used for recording and reproduction of an optical disk, a magnetooptical disk, or the like is packaged as a unit in which a laser diode LD and a photodiode PD to monitor are integrated. In the package unit, a cathode terminal 1 of the laser diode LD, an anode terminal 2 of the photodiode PD, and a common terminal 3 to which an anode of the laser diode LD and a cathode of the photodiode PD are commonly connected are taken out as external pins.

As a control circuit of such a laser diode, either one of the following two methods is used.
(1) A negative power source is used for the control circuit.
(2) A casing portion of the unit is insulated and a driving circuit is constructed by a positive power source by a floating process.

As a magnetooptical disk apparatus using such a laser diode which is operated by a negative power source, there is an apparatus as disclosed in JP-A-63-37843.

However, the use of the negative power source for the control circuit of the laser diode results in complication such that sequence processes to turn on/off the power source are necessary.

On the other hand, in the field of a small disk which is used in a note type personal computer or the like, since a power source of a battery is used, only a positive power source of +5 V or +12 V is generally used. When the conventional optical disk or magnetooptical disk using a negative power source is installed in a system, there is a problem such that the number of kinds of power sources must be increased.

Further, when the laser diode of FIG. 1 is floated and used as a positive power source, since the unit casing cannot be connected to the common base ground, it is disadvantageous because a countermeasure for a radio wave trouble must be taken.

In recent years, accordingly, as shown in FIG. 2, opposite to the conventional unit of FIG. 1, the following unit is put into practical use: namely, an anode terminal 4 of the laser diode LD, a cathode terminal 5 of the photodiode PD, and a common terminal 6 to which a cathode of the laser diode LD and an anode of the photodiode PD are commonly connected are taken out as external pins. By using the unit of FIG. 2, a laser diode control circuit using only a positive power source can be constructed (JP-A-3-69030, JP-A-62-149033).

In the case of using a positive power source for the control circuit of the laser diode, a current switch as an NPN transistor in the case of the negative power source, for example, a current switch to execute a high frequency modulation of the read power or a data modulation of the write power is replaced to a current switch using a PNP transistor in the case of a positive power source due to a transistor junction structure.

However, in the PNP type device structure, since a junction capacity is large, a high speed current switch doesn't exist. A high speed NPN type current switch must be used as a current switch to execute a high frequency modulation of the read power and the data modulation of the write power.

Consequently, only a change from the negative power source to the positive power source is inadequate and a control apparatus of a laser diode having a control circuit which is peculiar to the positive power source is required.

SUMMARY OF THE INVENTION

It is an object of the invention to provide a control apparatus of a laser diode which can accurately operate by use of only a positive power source.

Another object of the invention is to provide a control apparatus of a laser diode for controlling a light emitting power by switching a combination of a current sucking type current source and a current disgorging type current source by a current switch for the laser diode which operates by a positive power source.

Another object of the invention is to provide a control apparatus of a laser diode in which since a control circuit can be constructed by only a positive power source, in the case of using a battery power source, the laser diode can be driven by a simple power source construction.

Still another object of the invention is to provide a control apparatus of a laser diode, in which a current switch which requires a high operating speed such as current switch to execute a data modulation of a write power, current switch to perform a high frequency modulation of a read power, or the like is constructed as a current sucking type, so that a high speed operation can be realized by using an NPN type high speed current switch.

Still another object of the invention is to provide a control apparatus of a laser diode, in which a maximum write current or a maximum erase current is supplied to a laser diode 10 from a disgorging type constant current source in the writing or erasing mode, thereby allowing the laser diode to emit a light of a write power or an erase power.

Still another object of the invention is to provide a control apparatus of a laser diode, in which a write current is supplied to a laser diode from a disgorging type constant current source and a difference between the write current and the read current is sucked from the write current by a sucking type constant current source in the reading mode, thereby allowing the laser diode to emit a light of a read power.

Still another object of the invention is to provide a control apparatus of a laser diode, in which a current switch connected to a sucking type constant current source is switched in accordance with write data in the writing mode, thereby controlling a write power.

Still another object of the invention is to provide a control apparatus of a laser diode, in which a disgorging type constant current source and a sucking type constant current source are also connected through a current switch to a photodiode to monitor a light emission amount of the laser diode in a manner similar to a laser diode and automatic light amount control means is made operative by a monitor light corresponding to a read power, thereby reducing a fluctuation of a light amount due to a temperature or a time-dependent change.

Still another object of the invention is to provide a control apparatus of a laser diode, in which a modulation is performed by a frequency which is higher by one or more digit than a frequency in the case of write data in the reading mode, thereby reducing influences by noises of the laser diode or backtalk noises.

Still another object of the invention is to provide a control apparatus of a laser diode, in which by controlling an average power of a high frequency modulation signal and a base read power (DC component) in the writing mode to the same level, the APC can be executed in not only the reading mode but also the writing mode and the erasing mode and a light amount can be controlled at a high accuracy.

The present invention intends to control a laser diode in which a cathode is connected to the ground side of a positive power source and an anode is connected to the plus voltage side of the positive power source through a control circuit and whose light emission is driven.

With respect to the control of such a laser diode, there is provided a disgorging type first current source to supply a current $I_w$ corresponding to a write power $P_w$ to the laser diode.

There is also provided a sucking type second current source which is connected between the first current source and a laser diode 10 through a first current switch that is turned on/off in accordance with write data in the writing mode (or is turned off in the erasing mode) and which supplies a differential current $I_w-I_r$ (or $I_e-I_r$) between a current $I_w$ (or $I_e$) corresponding to a write power $P_w$ (or erase power $P_e$) and a current $I_r$ corresponding to a read power $P_r$.

Further, there is provided a sucking type third current source which is connected between the first current source and the laser diode through a second current switch which is turned on in the reading mode and which supplies a differential current $I_r-I_{th}$ between the current $I_r$ corresponding to the read power $P_r$ and a current $I_{th}$ corresponding to the zero power.

Further, there are provided: monitor means for monitoring a light emitting power of the laser diode and for generating a monitor signal corresponding to the read power $P_r$ in any of the writing mode and the reading mode (or the erasing mode); and automatic light emitting power control means (APC) for controlling the output current $I_w$ of the first constant current source −1 on the basis of a difference signal between the monitor signal returned from the monitor means and a preset read power reference signal.

In addition, there is provided modulating means for modulating an emission light of the laser diode by a frequency higher than that in the case of the write data in the reading mode.

The modulating means has: a disgorging type fourth current source which is connected between the first current source and the laser diode and which supplies a current $I_{hfm}$ such that an average value of the high frequency modulating power corresponds to the read power $P_r$; and a sucking type fifth current source which is connected between the first current source and the laser diode through a third current switch that is turned on in the writing or erasing mode and is turned on/off by a frequency signal higher than that of the write data in the reading mode and which supplies a current $I_{hfm}$ such that an average value of the high frequency modulating power corresponds to the read power $P_r$.

The monitor means comprises: a photodiode to monitor a light amount of a laser diode; a PNP type current mirror circuit to generate a current, as a monitor current, corresponding to a light reception current flowing in the photodiode; a disgorging type sixth current source which is connected between the current mirror circuit and the photodiode and which supplies a differential current $(I_{mw}-I_{mr})$ between a monitor current $I_{mw}$ corresponding to the write power $P_w$ and a monitor current $I_{mr}$ corresponding to the read power $P_r$; and a sucking type seventh current source which is connected between the current mirror circuit and the photodiode through a fourth current switch that is turned off in the writing or erasing mode and is turned on in the reading mode and which supplies the differential current $(I_{mw}-I_{mr})$ between the monitor current $I_{mw}$ corresponding to the write power $P_w$ and the monitor current $I_{mr}$ corresponding to the read power $P_r$.

Further, the automatic light emitting power control means controls an output write current $I_w$ of the first constant current source on the basis of a difference signal between the monitor current returned from the monitor means and the preset write power reference signal. Such a control is also similarly performed in the erasing mode.

According to such a control of the laser diode, the maximum current to drive the laser diode, for example, the write current is supplied to the laser diode by the disgorging type first constant current source and a difference between the write current and the read current is led from the disgorging type first constant current source by the sucking type second constant current source in the reading mode, thereby supplying the read current to the laser diode.

In the writing mode, the first current switch is connected to the sucking type second constant current source and is switched in accordance with the write data.

Further, the disgorging type sixth constant current source and the sucking type seventh constant current source are also connected through the fourth current switch to the photodiode to monitor the light emission amount of the laser diode in a manner similar to the laser diode side. The automatic light amount control means (APC) is made operative by a monitor light corresponding to the read power, thereby reducing the fluctuation of the light amount due to a temperature and a time-dependent change.

In the reading mode, a modulation is executed at a frequency which is one or more digit higher than that in the case of the write data, thereby reducing influences by the noises of the laser diode and the backtalk noises.

By controlling the average power of the high frequency modulation signal and the base read power (DC component) in the writing mode to the same level, the APC can be performed in not only the reading mode but also the writing mode and erasing mode and the light amount can be controlled at a high accuracy.

Further, since the control circuit can be constructed by only the positive power source, in the case of using a battery power source, the control circuit can be driven by a simple power source construction.

With respect to the current switches in which a high operating speed is required, namely, with regard to the second current switch to execute the data modulation of a write power $P_w$ and the fifth current switch to execute the high frequency modulation of the read power $P_r$, by setting the current sucking type current switches, NPN type high speed current switches can be used.

The above and other objects, features, and advantages of the present invention will become more apparent from the following detailed description with reference to the drawings.

DETAILED DESCRIPTION OF THE PREFERRED EMBODIMENTS

First Embodiment

Figure 3:
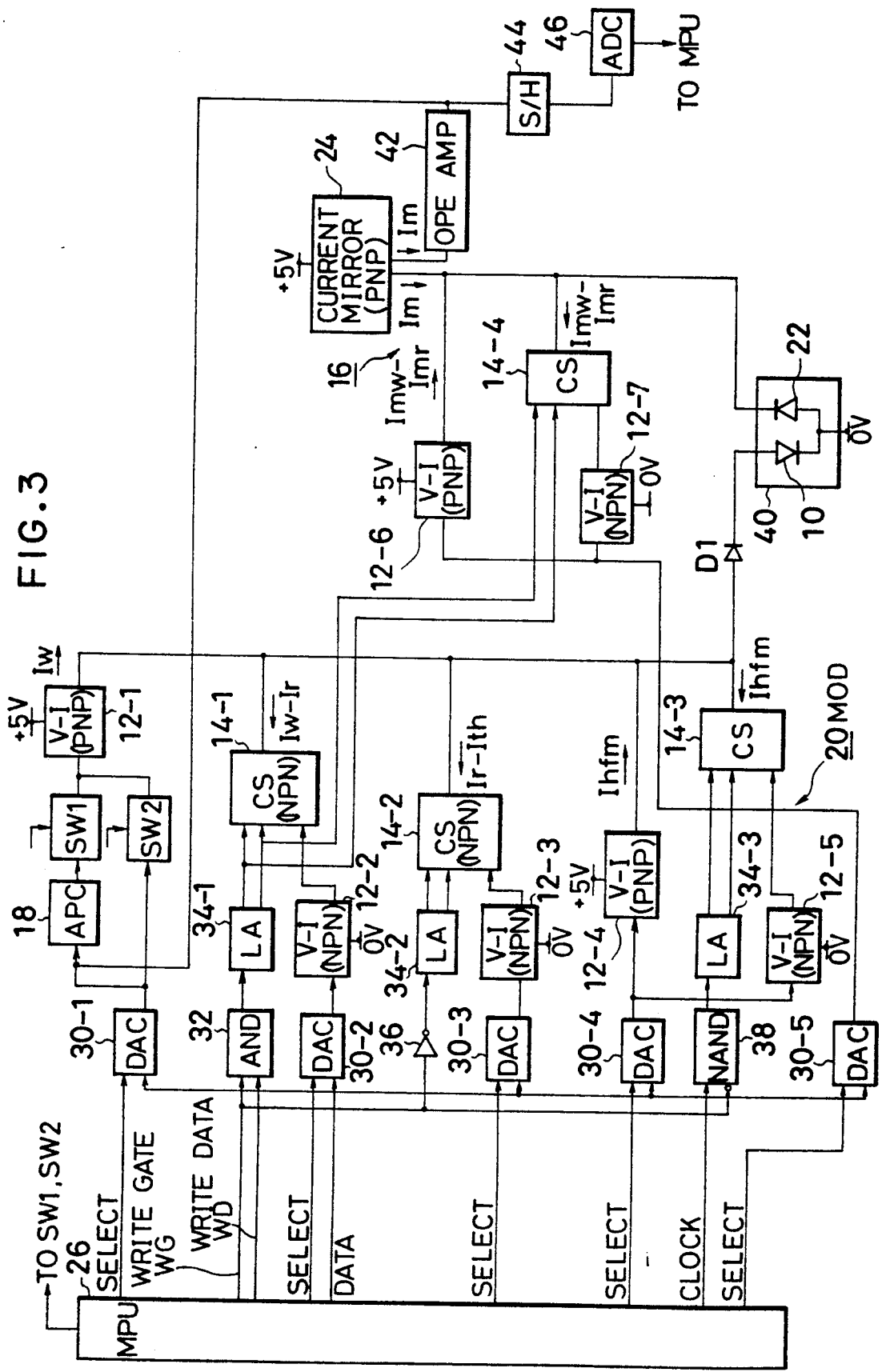
FIG. 3 is a constructional diagram showing the first embodiment of the invention.

FIG. 3 is a constructional diagram showing the first embodiment of the invention.

Figure 1:
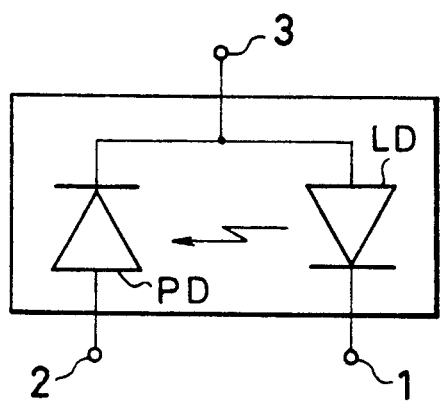
FIG. 1 is an explanatory diagram showing a unit construction of a conventional laser diode.
Figure 2:
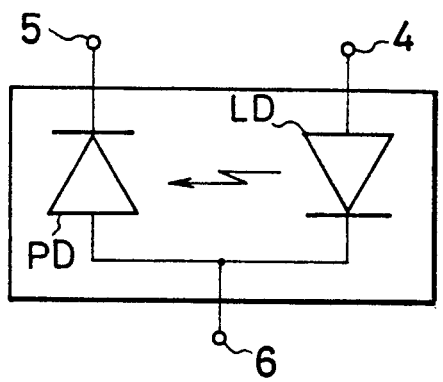
FIG. 2 is an explanatory diagram of a unit construction of a laser diode which is used on the assumption of a positive power source.

In FIG. 3, reference numeral 10 denotes a laser diode which is packaged into a unit 40 integratedly with a photodiode 22 to monitor. Practically speaking, in a manner similar to the circuit shown in FIG. 2, a common terminal to which an anode terminal of the laser diode 10 and a cathode terminal of the photodiode 22 are commonly connected and a cathode of the laser diode 10 and an anode of the photodiode 22 are commonly connected is taken out to the outside. The common terminal is connected to the ground of a positive power source shown by 0 V.

A V-I converter 12-1 as a first constant current source is connected between the laser diode 10 and the positive power source of +5 V, thereby supplying a write current $I_w$ to emit a light of a write power $P_w$ as a maximum current or an erase current $I_e$ equal to the write current $I_w$ to the laser diode 10.

The V-I converter 12-1 is of the PNP type and functions as a current disgorging type current source.

A control voltage to the V-I converter 12-1 is given from an automatic light emitting power control circuit (hereinafter, referred to as an APC circuit) 18 through a switch $SW_1$ or is directly given from a D/A converter 30-1 through a switch $SW_2$.

The APC circuit 18 controls the light emission of the laser diode 10 so as to keep a constant write power on the basis of a difference between a reference voltage from the D/A converter 30-1 and a monitor voltage, which will be clarified by a description hereinlater.

A V-I converter 12-2 as a second current source is connected between the V-I converter 12-1 and the laser diode 10 through a first current switch 14-1.

The V-I converter 12-2 is of the NPN type and functions as a current sucking type current source.

The V-I converter 12-2 is controlled by a conversion voltage of a D/A converter 30-2. The V-I converter 12-2 supplies a differential current ($I_w - I_r$) between the write current $I_w$ and the read current $I_r$.

The current switch 14-1 is constructed by a high speed NPN type and is controlled by an AND circuit 32 and a level converting circuit 34-1.

A write gate WG and write data WD are given to the AND circuit 32 from an MPU 26. The current switch 14-1 is controlled as follows.

| [WG] | [WD] | [Current switch 14-1] |
|------|------|----------------------|
| H    | H    | off                  |
| H    | L    | on                   |
| L    | L    | on                   |

That is, when the write data WD is on (H) in an on state of the write gate WG, the current switch 14-1 is turned off, so that the write current $I_w$ from the V-I converter 12-1 flows in the laser diode 10 as it is.

When the write data WD is turned off (is set to the low (L) level) in the above state, the current switch 14-1 is turned on. The current ($I_w - I_r$) is sucked from the write current $I_w$ and the current flowing in the laser diode 10 decreases from the write current $I_w$ to the read current $I_r$ (base light emitting power in the writing mode).

Figure 9:
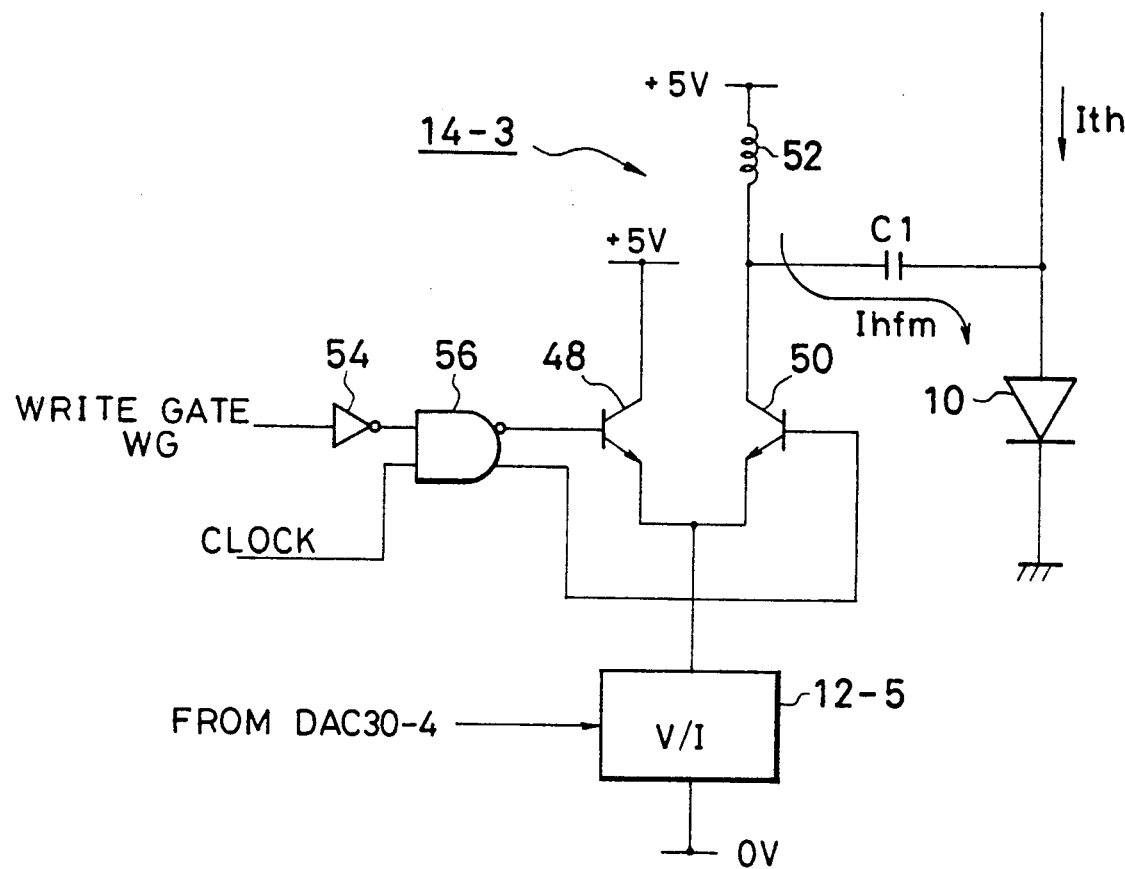
FIG. 9 is a circuit diagram of the embodiment of a current switch which is AC connected in FIG. 8.

The reason why two control lines are led out from the level converting circuit 34-1 is because the current switch 14-1 constructs a switching circuit using two NPN transistors as shown in FIG. 9, which will be clearly explained later.

A V-I converter 12-3 as a sucking type third current source is connected between the V-I converter 12-1 and the laser diode 10 through a second current switch 14-2, thereby supplying a differential current ($I_r - I_{th}$) between a read current $I_r$ corresponding to a read power Pr and a threshold current $I_{th}$ corresponding to the zero light emitting power.

The current switch 14-2 is controlled by the signal which is obtained by inverting the write gate WG from the MPU 26 by an inverter 36 and by further level converting the inverted signal by a level converting circuit 34-2.

That is, the current switch 14-2 is turned on in the reading mode when the write gate WG is turned off (L). By sucking the differential current ($I_r - I_{th}$) from the read current $I_r$ flowing into the laser diode 10, the current $I_r$ can be reduced to the threshold current $I_{th}$ corresponding to the zero light emitting power.

Further, a V-I converter 12-4 as a disgorging type fourth current source is connected between the V-I converter 12-1 and the laser diode 10. A V-I converter 12-5 as a sucking type fifth current source is also connected through a third current switch 14-3. Those component elements construct a modulating circuit 20 for modulating at a frequency which is one or more digit higher than that in the case of the write data WD upon light emission of the read power $P_r$.

The V-I converter 12-4 is controlled by a conversion voltage from a D/A converter 30-4 and supplies a current $I_{hfm}$ in which the average value of the high frequency modulating power is equal to the read power $P_r$ to the laser diode 10.

The V-I converter 12-5 sucks the current $I_{hfm}$ in which the average value of the high frequency modulating power is equal to the read power $P_r$ in a manner similar to the V-I converter 12-4.

The current $I_{hfm}$ which is sucked by the V-I converter 12-5 is turned on/off by the current switch 14-3, thereby allowing the modulation current to be supplied to the laser diode 10.

The current switch 14-3 is controlled by a clock from the MPU 26 through a level converting circuit 34-3 when the write gate WG which is obtained through an NAND circuit 38 is off.

That is, when the write gate WG is turned on (is set to the high (H) level), the clock is masked and the current switch 14-3 is held in an on state. The disgorging current $I_{hfm}$ from the V-I converter 12-4 is sucked to the V-I converter 12-5 as it is and no modulation current flows into the laser diode 10.

In the reading mode when the write gate WG is turned off (L), the current switch 14-3 is turned on/off in accordance with the clock, thereby supplying a modulation current which changes at a width of the current $I_{hfm}$ to the laser diode 10.

A monitor circuit 16 of a light emitting power based on the light reception current of the photodiode 22 will now be described.

A PNP type current mirror circuit 24 is connected between the photodiode 22 and the power source of +5 V.

The current mirror circuit 24 reverses the direction of the light reception current flowing in the photodiode 22. The resultant current is converted into the voltage signal by an operational amplifier 42. The voltage signal is supplied to a sample and hold circuit (S/H circuit) 44 and is converted into the digital signal by an A/D converter 46 and is transferred to the MPU 26 as monitor data of the light emitting power.

The monitor voltage from the operational amplifier 42 is returned to the APC circuit 18.

A V/I converter 12-6 as a current disgorging type sixth constant current source is connected between the current mirror circuit 24 and the photodiode 22. A current sucking type seventh constant current source 12-7 is also connected through a fourth current switch 14-4.

The V-I converter 12-6 generates a differential current ($I_{mw} - I_{mr}$) between a monitor current $I_{mw}$ of the write power $P_w$ and a monitor current $I_{mr}$ of the read power $P_r$.

The V-I converter 12-7 sucks the differential current ($I_{mw} - I_{mr}$) between the monitor current $I_{mw}$ of the write power $P_w$ and the monitor current $I_{mr}$ of the read power $P_r$.

In a manner similar to the current switch 14-1, the current switch 14-4 is controlled by the AND circuit 32 and the level converting circuit 34-1 and is turned off in the write light emitting mode and is turned on in the write non-light emitting mode and in the reading mode.

Therefore, even when the light reception current $I_{mw}$ corresponding to the write light emitting power $P_w$ flows into the photodiode 22 in the write light emitting mode, the current ($I_{mw} - I_{mr}$) is supplied from the V-I converter 12-6 by the turn-off of the current switch 14-4, so that the monitor current $I_m$ flowing into the current mirror circuit 24 becomes $$I_m = I_{mw} - (I_{mw} - I_{mr}) = I_{mr}$$

The same current as the read monitor current $I_{mr}$ also flows in the write light emitting mode.

Therefore, as well as in the reading mode, the monitor voltage corresponding to the read power $P_r$ is also always supplied to the APC circuit 18 in any of the write light emitting mode and the write non-light emitting mode.

The APC circuit 18 controls the disgorging current $I_w$ of the V-I converter 12-1 so as to keep the monitor voltage to the read power reference voltage on the basis of a difference between the monitor voltage which is returned from the monitor circuit 16 and a reference voltage to obtain the constant read power $P_r$ which is generated from the D/A converter 30-1.

In the ordinary use state, the switch $SW_1$ is turned on and the switch $SW_2$ is turned off by the control of the MPU 26 and the control by the APC circuit 18 is effectively performed.

In the automatic adjusting mode at the start of the use of the apparatus, the switch $SW_2$ is turned on and the switch $SW_1$ is turned off. The control voltage of the D/A converter 30-1 is directly applied to the V-I converter 12-1, thereby enabling the MPU 26 to adjust the write current.

The MPU 26 individually supplies selection signals to the D/A converters 30-1 to 30-5 and also commonly gives data for current control to them. By making the selection signal effective, specific one of the D/A converters is made operative and the data is converted into the analog voltage.

Figure 4:
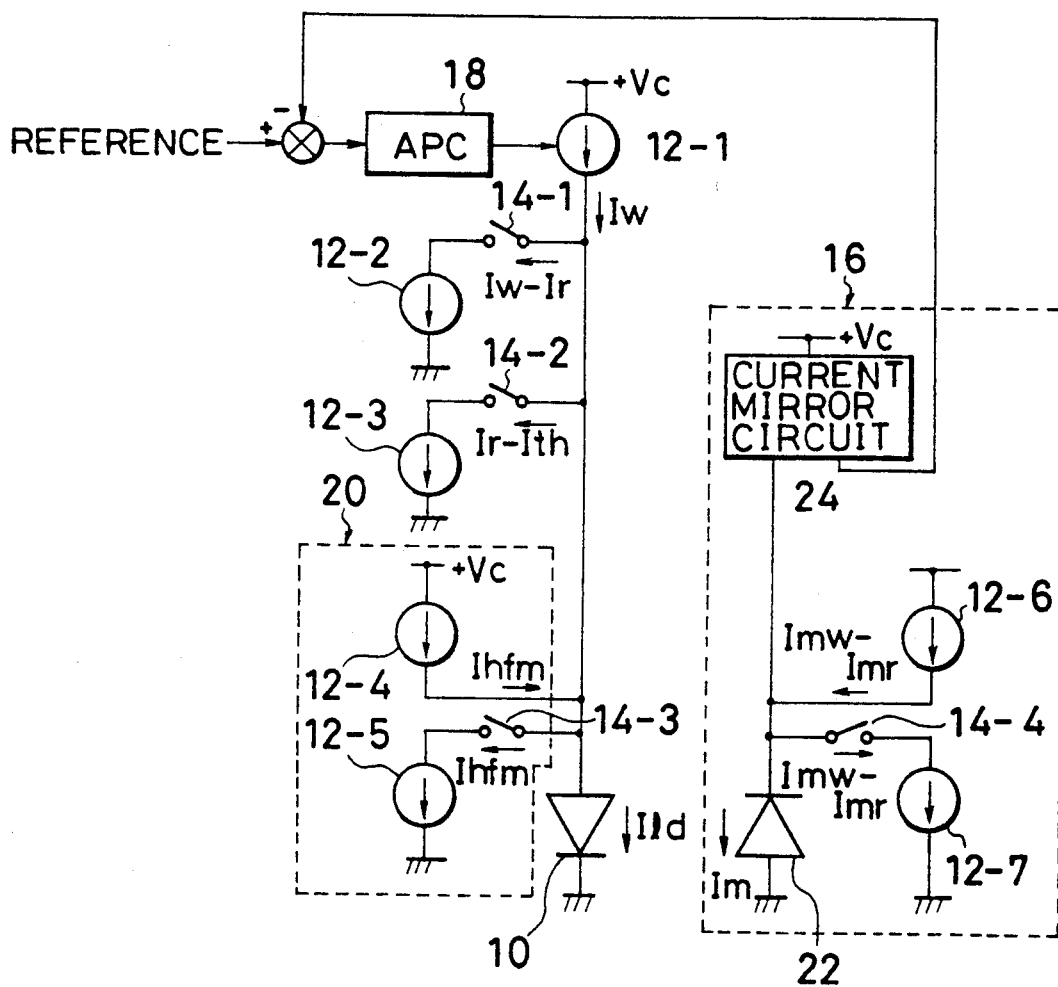
FIG. 4 is an explanatory diagram showing the operation principle of FIG. 3.

FIG. 4 shows the operation principle of the main section of the first embodiment of FIG. 3.

In FIG. 4, the disgorging type first current source 12-1 first supplies the current $I_w$ corresponding to the write power $P_w$ to the laser diode 10. The sucking type second current source 12-2 is connected between the first current source 12-1 and the laser diode 10 through the first current switch 14-1 and is turned on/off in accordance with the write data in the writing mode, thereby supplying a differential current $(I_w - I_r)$ between the current $I_w$ corresponding to the write power $P_w$ and the current $I_r$ corresponding to the read power $P_r$.

The monitor circuit 16 monitors a light emitting power of the laser diode 10 and generates a monitor signal corresponding to the read power $P_r$ in any of the writing mode and the reading mode. The APC circuit 18 controls the output current $I_w$ of the first constant current source 12-1 on the basis of a difference signal between the monitor signal returned from the monitor circuit 16 and a preset read power reference signal.

Figure 5:
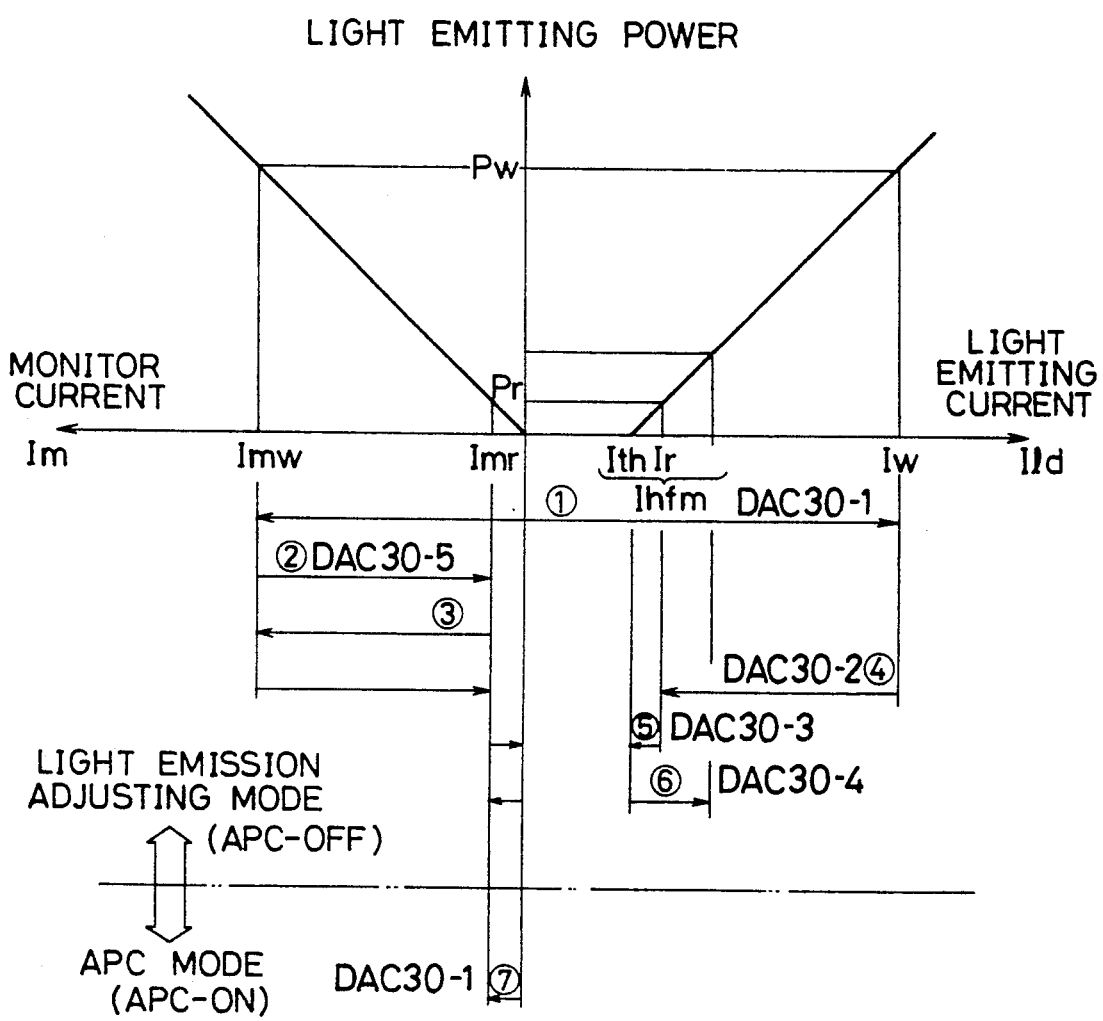
FIG. 5 is a characteristic diagram of a light emitting current, light emitting power, and a monitor current in FIG. 3.

FIG. 5 shows characteristics of a light emitting power $P_{ld}$ to a light emitting current $I_{ld}$ of the laser diode 10 and characteristics of the monitor current $I_m$ of the photodiode 22 to the light emitting power $P_{ld}$ of the laser diode 10 according to the embodiment of FIG. 3.

First, with respect to the laser diode 10, the write current $I_w$ (or erase current $I_e$) as a maximum current is set, so that the write power $P_w$ (or erase power $P_e$) is obtained.

The read current $I_r$ is set and the read power $P_r$ is derived. The monitor currents $I_{mw}$ and $I_{mr}$ are obtained in correspondence to the write power $P_w$ and read power $P_r$.

Further, the threshold current $I_{th}$ which gives a light emission start point of the laser diode 10 is set.

The modulation current $I_{hfm}$ in the read light emitting mode is set so that the monitor current in the modulating state by the clock coincides with the read monitor current $I_{mr}$, that is, the average value of the modulation light emitting power coincides with the read power $P_r$.

NPN type current switches which can be switched at a high speed are used as all of the current switches 14-1 to 14-4. In correspondence to the NPN type of the current switches 14-1 to 14-4, NPN type converters are also used as V-I converters 12-2, 12-3, 12-5, and 12-7. PNP type converters of a low operating speed can be used as the other V-I converters 12-1 and 12-6.

Light Emission Adjustment in the First Embodiment

Light emission adjusting processes to obtain the characteristics of FIG. 5 will now be described with reference to flowcharts of FIGS. 6 and 7. In FIG. 5, the order of adjustment in association with the light emission adjusting processes is indicated by reference numerals ① to ⑦.

Figure 6:
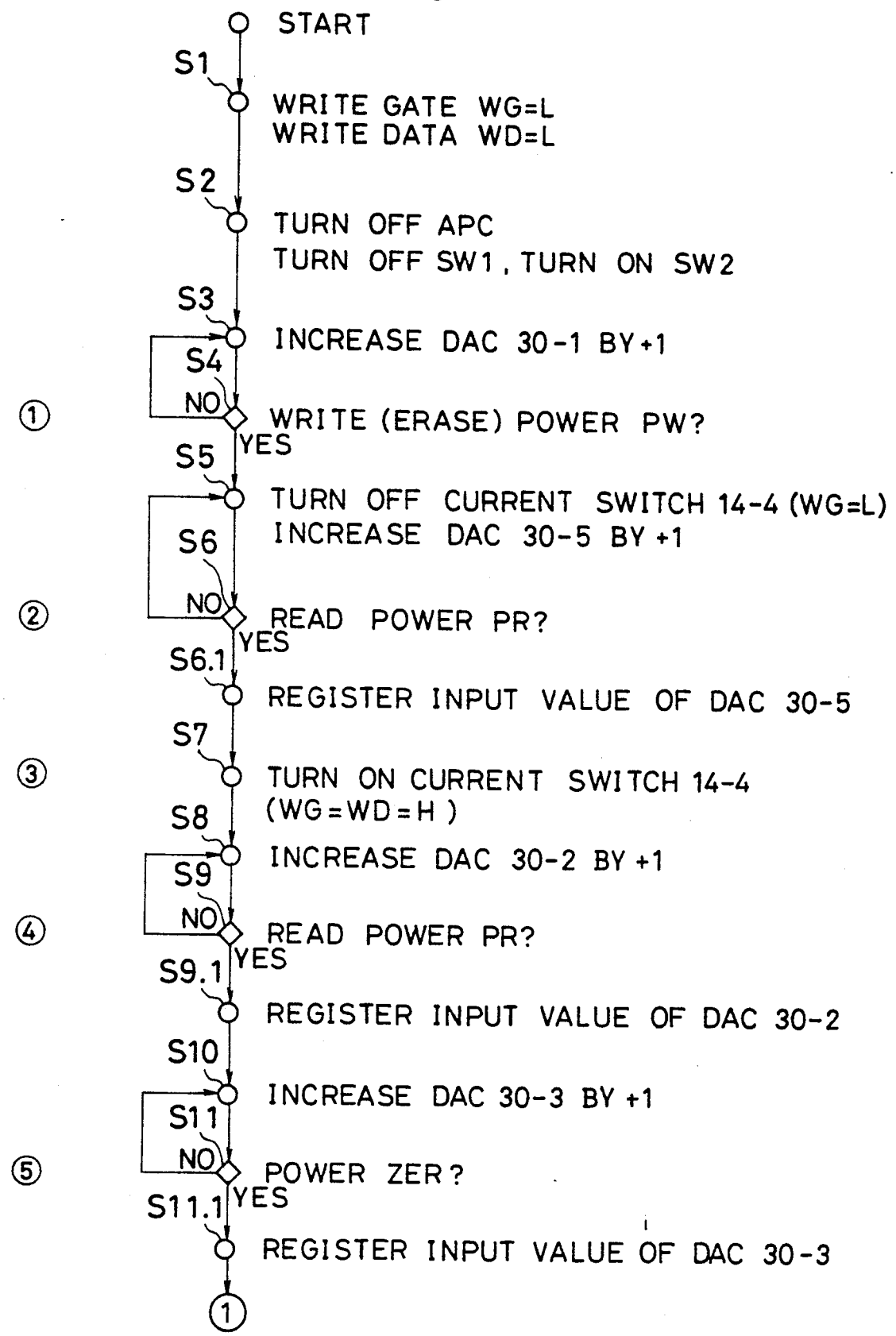
FIG. 6 is a flowchart showing the light emission adjusting operation of FIG. 3.

In FIG. 6, the light emission adjustment is started by first turning off (L) both of the write gate WG and the write data WD in step S1 and, further, by turning off the APC circuit 18 in step S2. The APC circuit 18 is turned off by turning off the switch $SW_1$ and turning on the switch $SW_2$.

By turning on the switch $SW_2$, the output of the D/A converter 30-1 is directly supplied to the V-I converter 12-1, thereby adjusting so as to supply the current $I_w$ (or $I_e$) in the writing mode (or erasing mode) to the laser diode 10.

That is, while the output voltage of the D/A converter 12-1 is increased in step S3, a check is made in step S4 to see if a specific write power $P_w$ (or erase power $P_e$) is obtained or not.

At this time, a monitor value of the light emitting power $P_{ld}$ is read in the following manner. The direction of the output current of the photodiode 22 for monitoring is reversed by the PNP type current mirror circuit 24. The resultant current is I/V converted into the voltage by the operational amplifier 42. The voltage is transmitted through the S/H circuit 44 and is converted by the A/D converter 46, thereby reading the monitor value.

It is necessary to calibrate an I-V conversion ratio (practically speaking, value of a resistance R which gives input/output characteristics $E = R \times I$) of the operational amplifier 42 so that the input voltage to the A/D converter 12-1 is set to a specified value for an emitting power from an optical head.

The output voltage of the D/A converter 30-5 is increased in step S5. In step S6, the control is stopped at a time point when the monitor value of the light emitting power is equal to the read power $P_r$ and the monitor read current $I_{mr}$ flows.

Due to this, the data for the D/A converter 30-5 which gives the monitor read current $I_{mr}$ is registered into a memory.

The V-I converters 12-6 and 12-7 are constructed as symmetrical type, thereby enabling the current of the same amount as the current supplied in the V-I converter 12-6 to be sucked into the V-I converter 12-7.

Since the current switch 14-4 is now off, the monitor value is equal to the monitor value $I_{mr}$ corresponding to the read power $P_r$. The monitor value $I_{mr}$ is registered into the memory.

When the current switch 14-4 is subsequently turned on in step S7, the monitor value is set to the monitor value $I_{mw}$ corresponding to the write power $P_w$.

The output of the D/A converter 30-2 is increased in step S8. The control is stopped at a time point when the read power Pr is derived in step S9.

In the above control, the sucking current $(I_w - I_r)$ is increased and the current flowing into the laser diode 10 is reduced in such a direction that the power changes from the write power $P_w$ to the red power $P_r$. The data for the D/A converter 30-2 at a time point when the read power $P_r$ is obtained is registered into the memory as data to obtain the current $(I_w - I_r)$ While the output voltage of the D/A converter 30-3 is subsequently increased in step S10, the control is stopped at a time point when the power is reduced to zero in step S11.

In the above control, the sucking current $(I_r - I_{th})$ is increased and the power is reduced from the read power $P_r$ until the stop of the light emission. The data for the D/A converter 30-3 to obtain the current $(I_r - I_{th})$ which gives the current $I_{th}$ at a time point when the read power is set to zero is registered into the memory in step S11.1.

Figure 7:
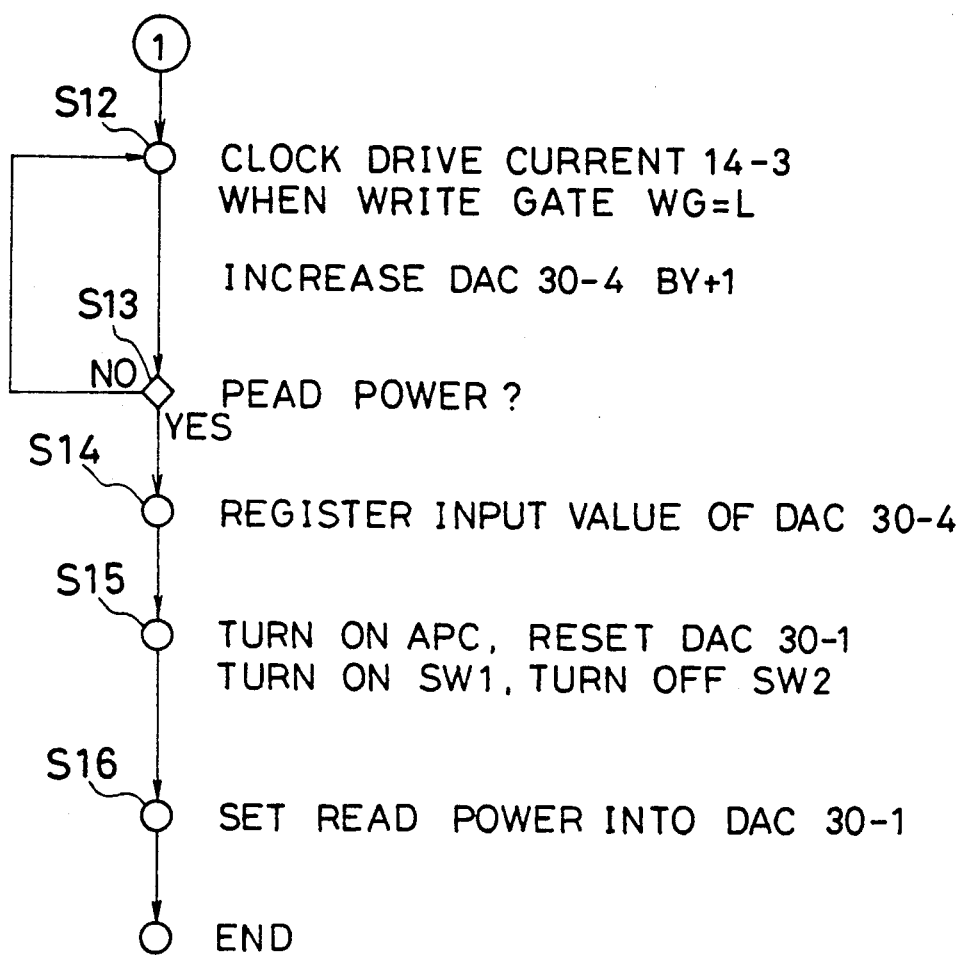
FIG. 7 is a flowchart showing the continuation of the light emission adjusting operation of FIG. 6.

The processing routine advances to step S12 in FIG. 7. In step S12, the write gate WG is turned off (L) to thereby allow the clock to be generated from the NAND circuit 38, the current switch 14-3 is turned on/off by the clock, and the modulating operation of the read power is started.

In the above state, the output voltage of the D/A converter 30-4 is increased and the control is stopped at a time point when the monitor value reaches the read power $P_r$ in step S13.

In the above control, the disgorging and sucking currents $I_{hfm}$ of the D/A converters 12-4 and 12-5 are increased in the modulation light emitting state and the data for the D/A converter 30-4 which gives $I_{hfm}$ at a time point when the monitor value which is obtained as an average value of the modulation light emitting power reaches the read power $P_r$ is registered into the memory in step S14.

Subsequently, the set data for the D/A converter 30-1 is reset in step S14 and the APC circuit 18 is turned on. The APC circuit 18 is turned on by turning on the switch $SW_1$ and turning off the switch $SW_2$.

Due to this, the control mode is switched from the light emission adjusting mode so far to the APC mode.

In step S15, the data which gives the read power $P_r$ is finally set into the D/A converter 30-1. A read power reference voltage is applied to the APC circuit 18. The control mode is set into the APC mode to control the light emission by the disgorging current $I_w$ of the V-I converter 12-1 so as to obtain the specific read power by setting a difference between the reference voltage and the monitor voltage obtained from the monitor circuit 16 to zero. A series of adjusting operations are finished.

In the control by the APC circuit 18, the monitor current corresponding to the read monitor current $I_{mr}$ corresponding to the read power $P_r$ is also obtained in the write light emitting mode or the erasing mode by the turn-off of the current switch 14-4. The light emission is controlled so as to always keep the read power $P_r$ to a predetermined power which is decided by a reference signal.

In FIG. 3, the common D/A converter 30-1 is used as a D/A converter for APC and a D/A converter for light emission adjustment. However, those D/A converters can be also independently provided.

The switches $SW_1$ and $SW_2$ can be also turned on and off by an external circuit instead of the MPU 26.

Second Embodiment

Figure 8:
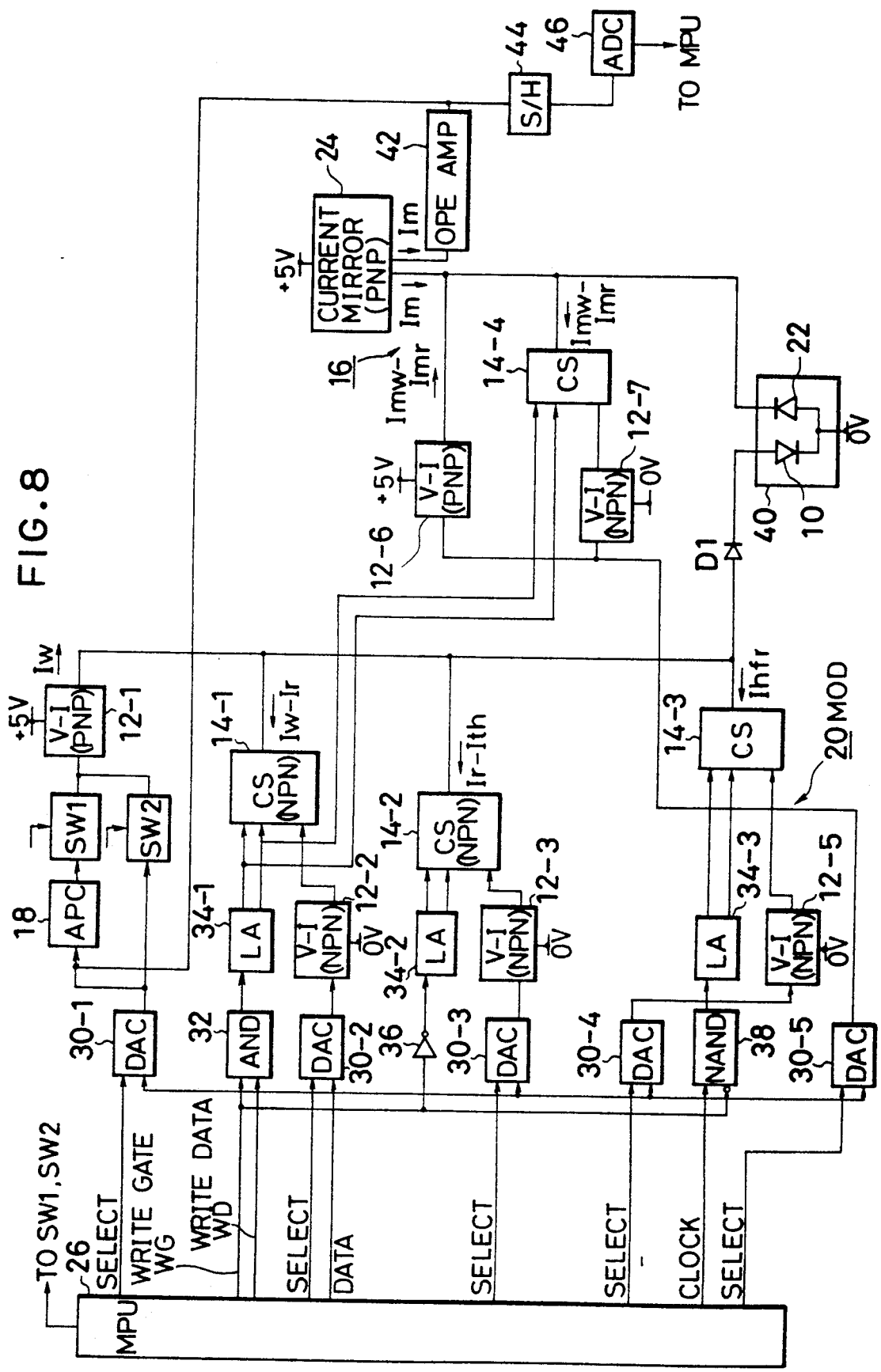
FIG. 8 is a constructional diagram showing the second embodiment of the invention.

FIG. 8 is a constructional diagram showing the second embodiment of the invention. The second embodiment is characterized in that the disgorging type V-I converter 12-4 as a fourth current source provided in the modulating circuit 20 of the first embodiment of FIG. 3 is eliminated in order to simplify the circuit construction.

In association with the elimination of the V-I converter 12-4 in FIG. 3, the second embodiment of FIG. 8 is characterized in that a capacitor $C_1$ is provided for the current switch 14-3 and that the laser diode 10 and the sucking type V-I converter 12-5 as a fifth current source are connected in an AC manner.

FIG. 9 shows a circuit embodiment of the current switch 14-3 in FIG. 8. Emitters of NPN transistors 48 and 50 are commonly connected to the V-I converter 12-5. A collector of the NPN transistor 48 is directly connected to a +5 V line. A collector of the NPN transistor 50 is connected to the +5 V line through an inductor 52. A node between the collector of the NPN transistor 50 and the inductor 52 is connected to the laser diode 10 side through the capacitor $C_1$ in an AC manner.

The NPN transistors 48 and 50 are controlled on the basis of the write gate WG and the clock by an inverter 54 and an AND circuit 56 having the function as an OR circuit 38 and a level converting circuit 34-3.

That is, when the write gate WG is off (L), the AND circuit 56 is set into a permitting state and passes the clock. When the clock is on (H), the transistor 48 is turned off and the transistor 50 is turned on. When the clock is off (L), the transistor 48 is turned on and the transistor 50 is turned off. Therefore, either one of the transistors 48 and 50 is always in the on state and the predetermined current $I_{hfm}$ which is determined by the output of the D/A converter 30-4 consequently flows into the V-I converting circuit 12-5.

In the modulation of the current which is supplied to the laser diode 10, there are repeated operations such that an energy is accumulated into the inductor 52 at the time of turn-on of the transistor 50 and the current Ihfm which is determined by the V-I converter 12-5 is supplied through the capacitor $C_1$ at the time of turn-off of the transistor 50 and a current which is obtained by adding the current $I_{hfm}$ to the threshold current $I_{th}$ which is always flowing is supplied.

The characteristics of the light emitting current, light emitting power, and monitor current according to the second embodiment of FIG. 8 are the same as the characteristics shown in FIG. 5 regarding the first embodiment of FIG. 3. The automatic adjustment to set each current value can be also realized by the same processes as those in FIGS. 6 and 7.

Third Embodiment

Figure 10:
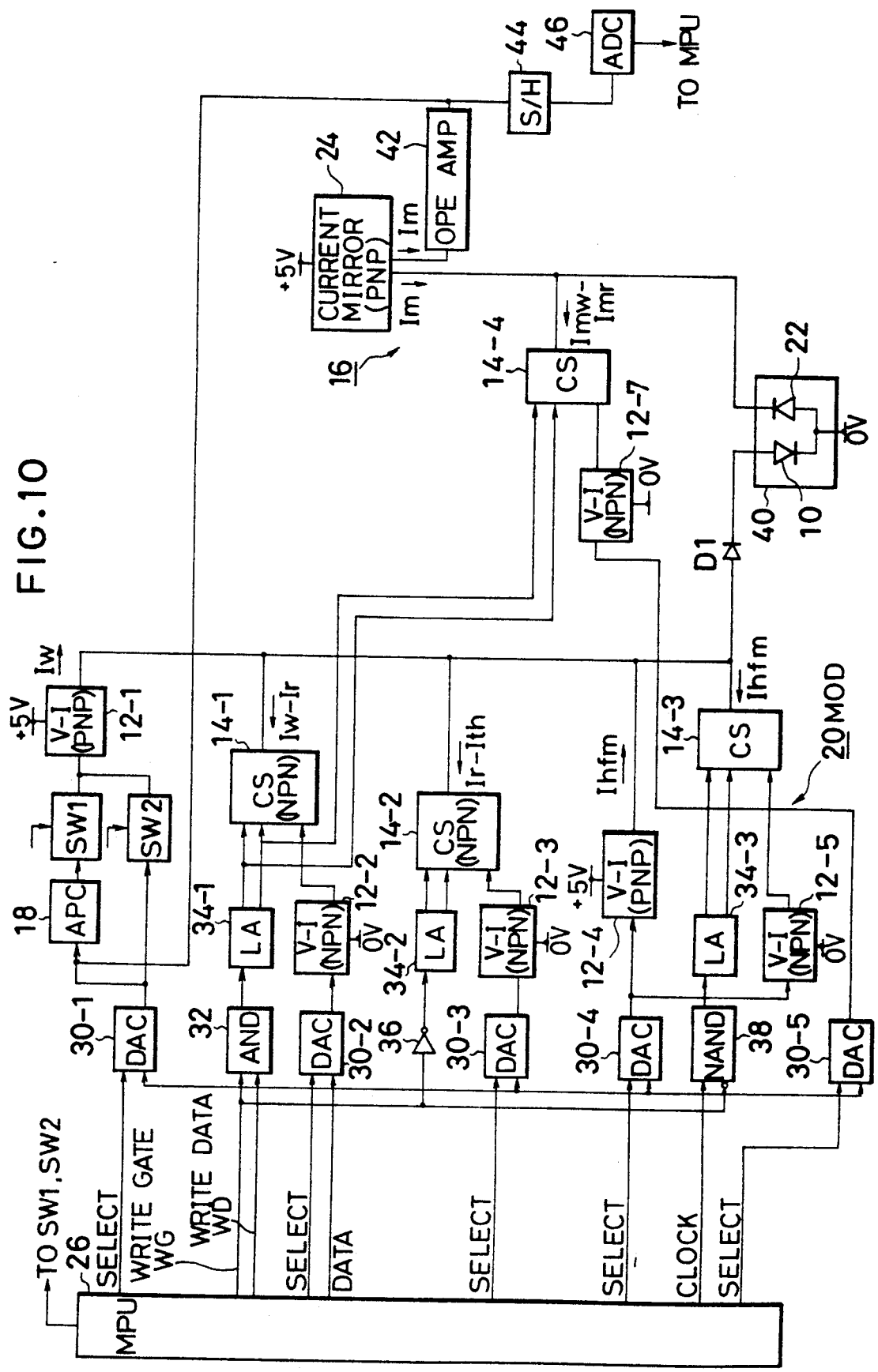
FIG. 10 is a constructional diagram showing the third embodiment of the invention.

FIG. 10 is a constructional diagram showing the third embodiment of the invention. The third embodiment is characterized in that the V-I converter 12-6 as a sixth current source provided in the monitor circuit 16 of the first embodiment of FIG. 3 is eliminated in order to simplify the circuit construction.

In association with the elimination of the V-I converter 12-6 in FIG. 3, according to the third embodiment of FIG. 10, the light emission is controlled by the APC circuit 18 so as to always keep the write power $P_w$ to a predetermined value in any of the writing mode, erasing mode, and reading mode.

That is, since only the V-I converter 12-7 as a sucking type seventh current source is provided for the monitor circuit 16 through the current switch 14-4, the monitor current $I_m$ of the current mirror circuit 24 becomes
Switch-off in the writing mode: $I_m = I_{mw}$
Switch on in the reading mode: $I_m = I_{rm} + (I_{mw} - I_{mr})$
$= I_{mw}$
The monitor current $I_{mw}$ corresponding to the write power $P_w$ is always obtained.

In the APC mode, therefore, the MPU 26 sets reference data which gives the write power $P_w$ into the D/A converter 12 1 and the APC circuit 18 controls the light emission so as to always keep the write power $P_w$ to a specific value by returning the monitor voltage in correspondence to the monitor current $I_{mw}$.

Figure 11:
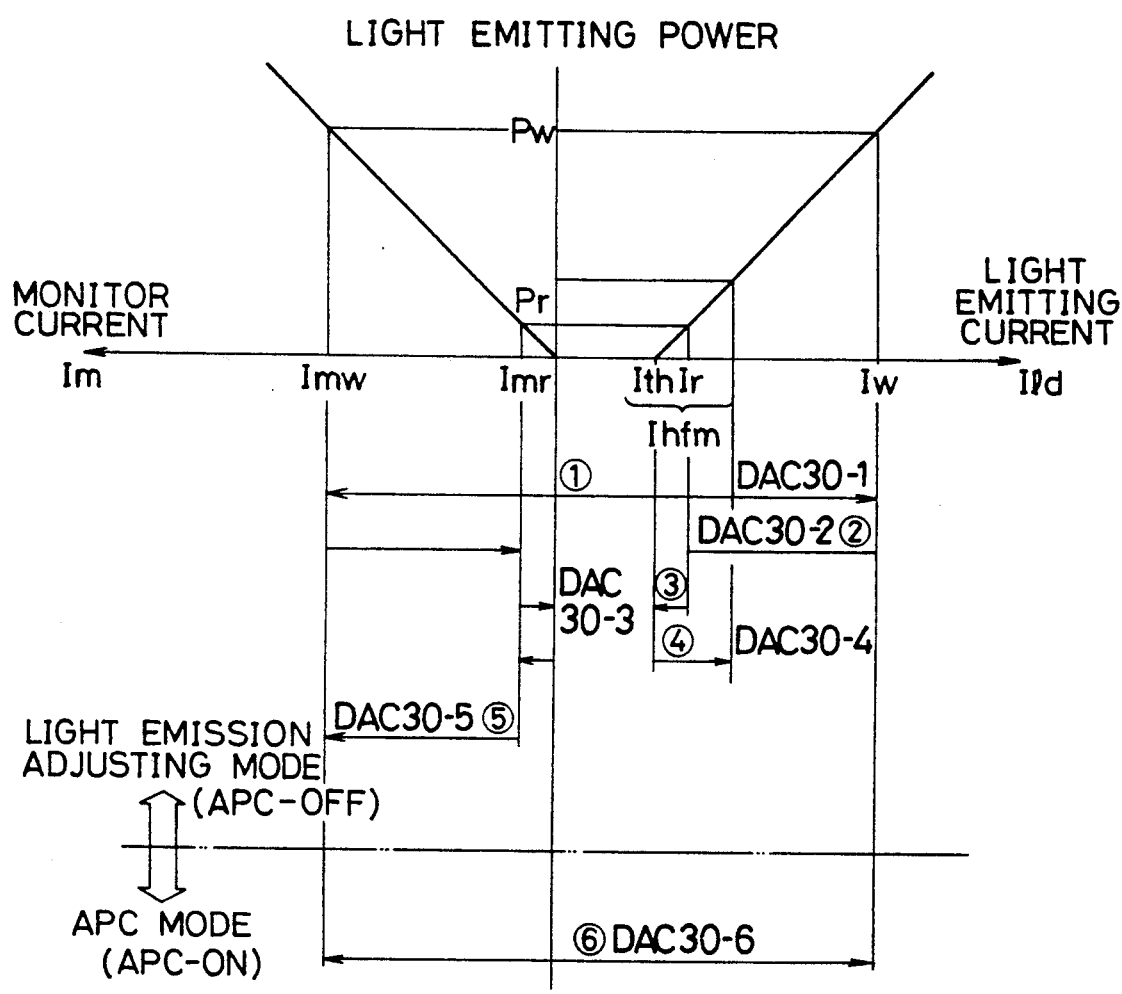
FIG. 11 is a characteristic diagram of a light emitting current, a light emitting power, and a monitor current in FIG. 10.

FIG. 11 shows characteristics of the light emitting current, light emitting power, and monitor current in the third embodiment of FIG. 10. Although the respective values are the same as those in the case of FIG. 5, the adjusting procedure in the light emission adjusting mode differs.

Light Emission Adjustment in the Third Embodiment

The light emission adjusting operations in the third embodiment of FIG. 10 will now be described with reference to flowcharts of FIGS. 12 and 13.

Figure 12:
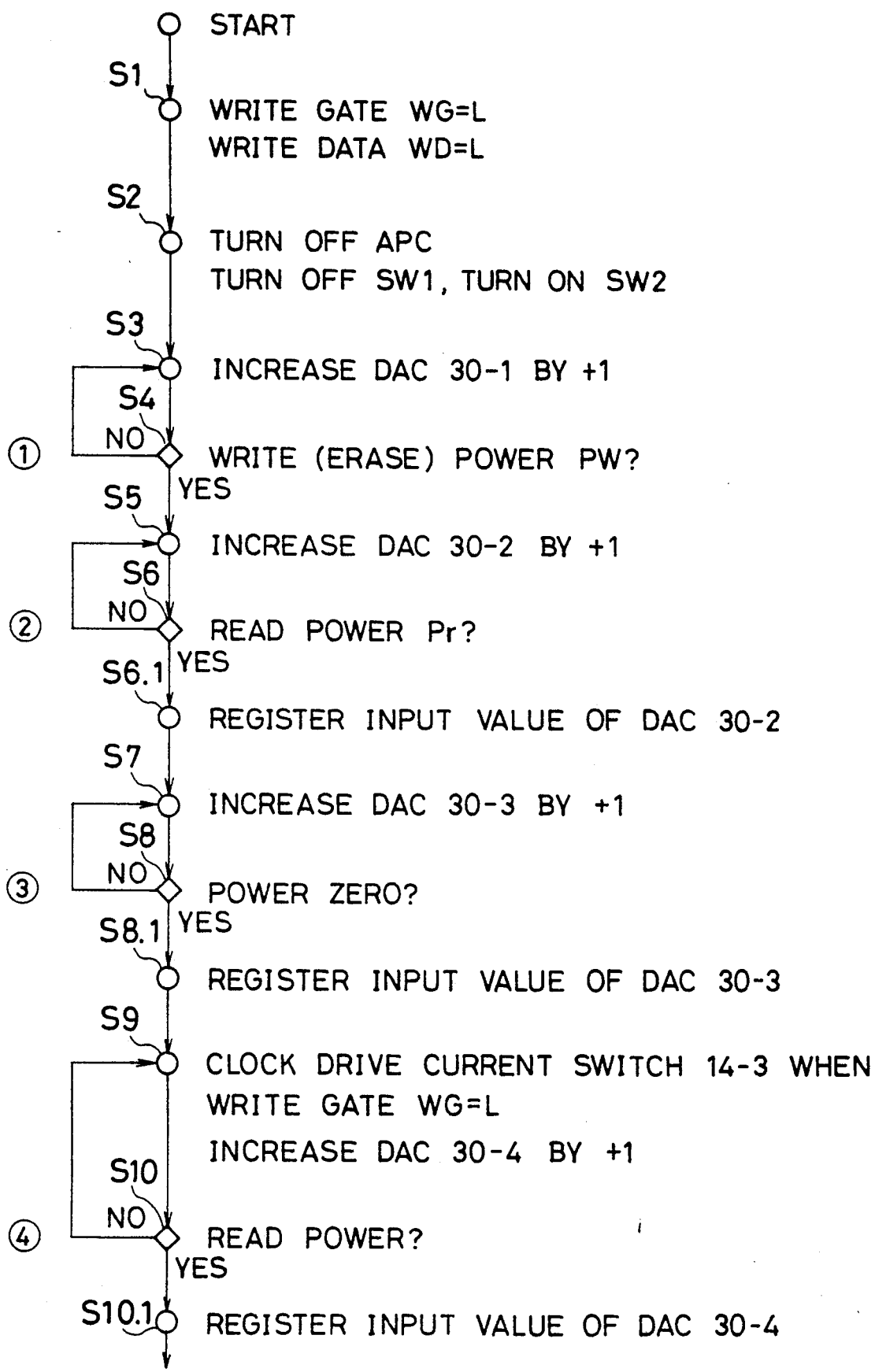
FIG. 12 is a flowchart showing the light emission adjusting operation of FIG. 10.
Figure 13:
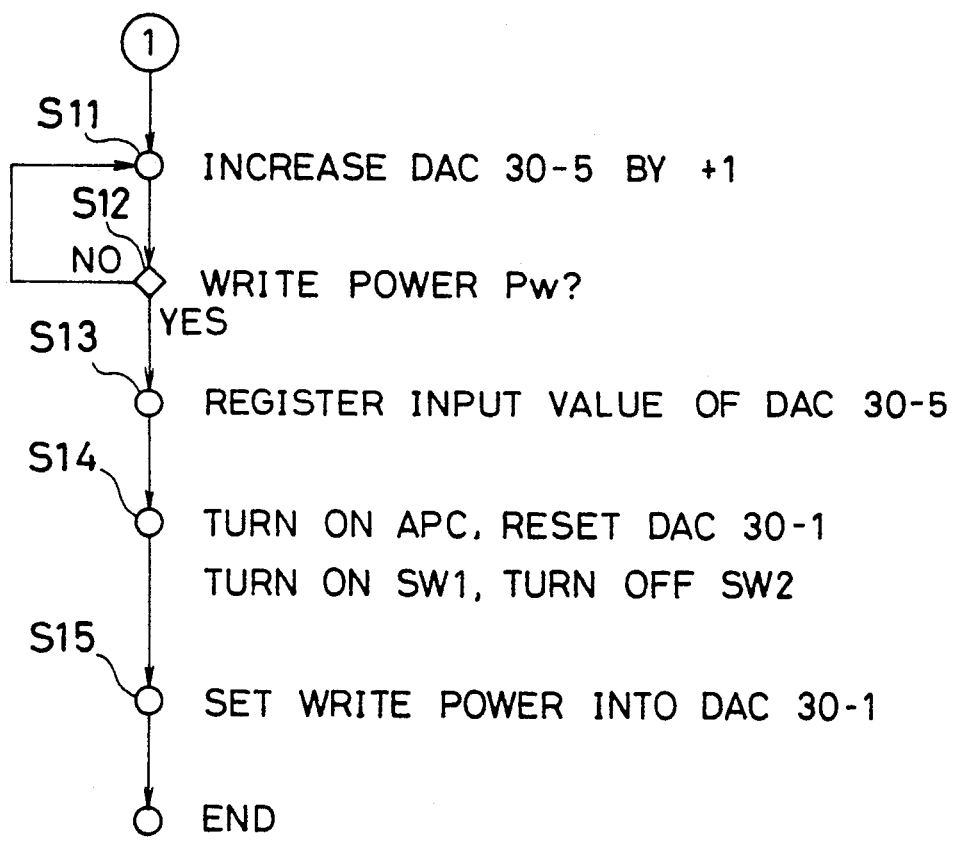
FIG. 13 is a flowchart showing the continuation of the light emission adjusting operation of FIG. 12.

In FIG. 12, the light emission adjustment is started by first turning of (L) both of the write gate WG and the write data WD in step S1 and, further, by turning off the APC circuit 18, namely, turning off the switch SW1 and turning on the switch $SW_2$ in step S2.

Subsequently, while the output voltage of the D/A converter 12-1 is increased in step S3, a check is made in step S4 to see if the specific write power $P_w$ (or erase power $P_e$) is obtained or not.

In the next step S5, the output of the D/A converter 30-2 is increased. The control is stopped at a time point when the read power $P_r$ is obtained in step S6. In the above control, the sucking current $(I_w - I_r)$ is increased and the current which is supplied to the laser diode 10 is reduced in such a direction that the power changes from the write power $P_w$ to the read power $P_r$. The data for the D/A converter 30-2 at a time point when the read power Pr is obtained is registered into the memory as data to obtain the current $(I_w - I_r)$.

In step S7, the output voltage of the D/A converter 30-3 is increased. The control is stopped at a time point when the power is equal to zero in step S8.

In the above control, the sucking current $(I_r - I_{th})$ is increased and the power is decreased from the read power $P_r$ to the stop of the light emission. The data for the D/A converter 30-3 to obtain the current $(I_r - I_{th})$ which gives the current $I_{th}$ at a time point when the read power is equal to zero is registered into the memory.

In the next step S9, the write gate WG is turned off (L) to thereby generate the clock from the NAND circuit 38. The current switch 14-3 is turned on/off by the clock and the modulating operation of the read power is started.

In the above state, the output voltage of the D/A converter 30-4 is increased and the control is stopped at a time point when the monitor value reaches the read power $P_r$ in step S10.

In the above control, the disgorging and sucking currents $I_{hfm}$ (peak current) of the D/A converters 12-4 and 12-5 are increased in the modulation light emitting state. The data for the D/A converter 30-4 which gives the current $I_{hfm}$ at a time point when the monitor value which is derived as an average value of the modulation light emitting power reaches the read power $P_r$ is obtained. The data is registered into the memory in step S10.1.

Subsequently, the output voltage of the D/A converter 30-5 of the monitor circuit 16 is increased in step S11 in FIG. 13. The control is stopped at a time point when the monitor value of the light emitting power reaches the write power $P_w$ and the monitor read current $I_{mr}$ flows in step S12.

Due to this, the data for the D/A converter 30-5 which gives the monitor write current $I_{mw}$ is registered into the memory in step S13.

In step S14, the set data for the D/A converter 30-1 is reset and the APC circuit 18 is turned on.

The APC circuit 18 is turned on by turning on the switch $SW_1$ and turning off the switch $SW_2$. Consequently, the control mode is switched from the light emission adjusting mode to the APC mode.

The data which gives the write power $P_w$ is finally set for the D/A converter 30-1 in step S15 and a reference voltage is given to the APC circuit 18. The control mode is set into the APC mode to execute the light emission control such that the write current $I_w$ from the V-I converter 12-1 is adjusted so as to set a difference between the reference voltage and the monitor voltage which is derived from the monitor circuit 16 to zero and the specific write power is maintained. A series of adjusting operations are finished.

According to the invention as mentioned above, the laser diode can be driven by only the positive power source and there is no need to isolate the laser diode and the optical head, so that a structure of the apparatus can be simplified. Further, since there is no need to form a negative power source in the apparatus, the apparatus can be driven by a simple battery power source.

Although the laser diode control apparatus according to the invention is used to an optical disk apparatus using a rewritable magnetooptical disk, the invention can be also applied to other optical recording and reproducing apparatuses.

What is claimed is:

1. A control apparatus of a laser diode, comprising:
   a laser diode (10) in which a cathode is connected to the ground side of a positive power source and an anode is connected to the plus voltage side of the positive power source through a control circuit;
   disgorging type first current source means (12-1) for supplying a current ($I_w$) corresponding to a write power ($P_w$) to said laser diode (10);
   sucking type second current source means (12-2) which is connected between the first current source means (12-1) and the laser diode (10) through a first current switch (14-1) that is turned on/off in accordance with write data in a writing mode and which supplies a differential current ($I_w - I_r$) between the current ($I_w$) corresponding to the write power ($P_w$) and a current ($I_r$) corresponding to a read power ($P_r$);
   monitor means (16) for monitoring a light emitting power of the laser diode (10) and for generating a monitor signal corresponding to the read power ($P_r$) in any of the writing mode and a reading mode; and
   automatic light emitting power control means (18) for controlling an output current ($I_w$) of the first current source means (12-1) on the basis of a difference signal between the monitor signal returned from said monitor means (16) and a preset read power reference signal.

2. A control apparatus according to claim 1, further comprising:
   sucking type third current source means (12-3) which is connected between the first current source means (12-1) and the laser diode (10) through a second current switch (14-2) that is turned on in the reading mode and which supplies a differential current ($I_r - I_{th}$) between the current ($I_r$) corresponding to the read power ($P_r$) and a current ($I_{th}$) corresponding to the zero power; and
   modulating means (20) for modulating an emitted light of the laser diode (10) at a frequency higher than a frequency in the case of write data in the reading mode.

3. A control apparatus according to claim 2, wherein said modulating means (20) comprises:
   disgorging type fourth current source means (12-4) which is connected between the first current source means (12-1) and the laser diode (10) and which supplies a current ($I_{hfm}$) in which an average value of a high frequency modulating power is equal to the read power ($P_r$); and a sucking type fifth current source means (12-5) which is connected between the first current source means (12-1) and the laser diode (10) through a third current switch (14-3) that is turned on in the writing mode or the erasing mode and is turned on/off by a frequency signal of a frequency higher than a frequency in the case of the write data in the reading mode and which supplies the current ($I_{hfm}$) in which an average value of a high frequency modulating power is equal to the read power ($P_r$).

4. A control apparatus according to claim 2, wherein said modulating means (20) comprises:

sucking type fifth current source means (12-5) for supplying a current ($I_{hfm}$) in which an average value of a high frequency modulating power is equal to the read power ($P_r$); and a third current switch (14-3) which is turned off in the writing mode or the erasing mode and is turned on/off by a frequency signal of a frequency higher than a frequency in the case of the write data in the reading mode, and wherein said fifth current source means (12-5) is connected in an AC manner between the first current source means (12-1) and the laser diode (10) through the third current switch (14-3) and a capacitor ($C_1$).

5. A control apparatus according to claim 1, wherein said monitor means (16) comprises:

a photodiode (22) to monitor a light amount of the laser diode (10);

a PNP type current mirror circuit (24) to generate a current, as a monitor current, corresponding to a light reception current flowing in the photodiode (22);

disgorging type sixth current source means (12-6) which is connected between the current mirror circuit (24) and the photodiode (22) and which supplies a differential current ($I_{mw} - I_{mr}$) between a monitor current ($I_{mw}$) corresponding to the write power ($P_w$) and a monitor current ($I_{mr}$) corresponding to the read power ($P_r$); and sucking type seventh current source means (12-7) which is connected between the current mirror circuit (24) and the photodiode (22) through a fourth current switch (14-4) that is turned off in the writing mode or the erasing mode and is turned on in the reading mode and which supplies the differential current ($I_{mw} - I_{mr}$) between the monitor current ($I_{mw}$) corresponding to the write power ($P_w$) and the monitor current ($I_{mr}$) corresponding to the read power ($P_r$).

6. A control apparatus of a laser diode, comprising:

a laser diode (10) in which a cathode is connected to the ground side of a positive power source and an anode is connected to the plus voltage side of the positive power source through a control circuit;

disgorging type first current source means (12-1) for supplying a current ($I_e$) corresponding to an erase power ($P_e$) to the laser diode (10);

sucking type second current source means (12-2) which is connected between said first current source means and the laser diode through a first current switch (14-1) that is turned off in an erasing mode and which supplies a differential current ($I_e - I_r$) between the current ($I_e$) corresponding to the erase power ($P_e$) and a current ($I_r$) corresponding to a read power ($P_r$);

monitor means (16) for monitoring a light emitting power of the laser diode (10) and for generating a monitor signal corresponding to the read power ($P_r$) in any of the erasing mode and a reading mode; and automatic light emitting power control means (18) for controlling the output current ($I_e$) of said first current source means (12-1) on the basis of a difference signal between the monitor signal returned from the monitor means (16) and a preset read power reference signal.

7. A control apparatus according to claim 6, further comprising:

sucking type third current source means (12-3) which is connected between the first current source means (12-1) and the laser diode (10) through a second current switch (14-2) that is turned on in the reading mode and which supplies a differential current ($I_r - I_{th}$) between the current ($I_r$) corresponding to the read power ($P_r$) and a current ($I_{th}$) corresponding to the zero power; and modulating means (20) for modulating an emitted light of the laser diode (10) at a frequency higher than a frequency in the case of the write data in the reading mode.

8. A control apparatus according to claim 7, wherein said modulating means (20) comprises:

disgorging type fourth current source means (12-4) which is connected between the first current source means (12-1) and the laser diode (10) and which supplies a current ($I_{hfm}$) in which an average value of a high frequency modulating power is equal to the read power ($P_r$); and sucking type fifth current source means (12-5) which is connected between the first current source means (12-1) and the laser diode (10) through a third current switch (14-3) that is turned on in the writing mode or the erasing mode and is turned on/off by a frequency signal of a frequency higher than a frequency in the case of the write data in the reading mode and which supplies the current ($I_{hfm}$) in which the average value of the high frequency modulating power is equal to the read power ($P_r$).

9. A control apparatus according to claim 7, wherein said modulating means (20) comprises:

sucking type fifth current source means (12-5) for supplying a current ($I_{hfm}$) in which an average value of a high frequency modulating power is equal to the read power ($P_r$); and a third current switch (14 3) which is turned off in the writing mode or the erasing mode and is turned on/off by a frequency signal of a frequency higher than a frequency in the case of the write data in the reading mode, and wherein said fifth current source means (12-5) is connected in an AC manner between the first current source means (12-1) and the laser diode (10) through the third current switch (14-3) and a capacitor ($C_1$).

10. A control apparatus according to claim 6, wherein said monitor means (16) comprises:

a photodiode (22) to monitor a light amount of the laser diode (10);

a PNP type current mirror circuit (24) to generate a current, as a monitor current, corresponding to a light reception current flowing in the photodiode (22);

disgorging type sixth current source means (12-6) which is connected between said current mirror circuit (24) and the photodiode (22) and which supplies a differential current ($I_{mw} - I_{mr}$) between a monitor current ($I_{mw}$) corresponding to a write power ($P_w$) and a monitor current ($I_{mr}$) corresponding to the read power ($P_r$); and sucking type seventh current source means (12-7) which is connected between the current mirror circuit (24) and the photodiode (22) through a fourth current switch (14-4) that is turned off in the writing mode or the erasing mode and is turned on in the reading mode and which supplies the differential current ($I_{mw} - I_{mr}$) between the monitor current ($I_{mw}$) corresponding to the write power ($P_w$) and the monitor current ($I_{mr}$) corresponding to the read power ($P_r$).

11. A control apparatus of a laser diode, comprising:

a laser diode (10) in which a cathode is connected to the ground side of a positive power source and an anode is connected to the plus voltage side of the positive power source through a control circuit and whose light emission is driven;

disgorging type first current source means (12-1) for supplying a current ($I_w$) corresponding to a write power ($P_w$) to the laser diode (10);

sucking type second current source means (12-2) which is connected between the first current source means (12-1) and the laser diode (10) through a first current switch (14-1) that is turned on/off in accordance with write data in a writing mode and which supplies a differential current ($I_w - I_r$) between the current ($I_w$) corresponding to the write power ($P_w$) and a current ($I_r$) corresponding to a read power ($P_r$);

sucking type third current source means (12-3) which is connected between the first current source means (12-1) and the laser diode (10) through a second current switch (14-2) that is turned on in a reading mode and which supplies a differential current ($I_r - I_{th}$) between the current ($I_r$) corresponding to the read power ($P_r$) and a current ($I_{th}$) corresponding to the zero power;

monitor means (16) for monitoring a light emitting power of the laser diode (10) and for generating a monitor signal corresponding to the write power ($P_w$) in any of the writing mode and the reading mode; and automatic light emitting power control means (18) for controlling the output current ($I_w$) of the first constant current source means (12-1) on the basis of a difference signal between the monitor signal returned from the monitor means (16) and a preset write power reference signal.

12. A control apparatus according to claim 11, wherein said monitor means (16) comprises:

a photodiode (22) to monitor a light amount of the laser diode (10);

a PNP type current mirror circuit (24) to generate a current, as a monitor current, corresponding to a light reception current flowing in the photodiode (22);

a fourth current switch (14-4) which is turned off in the writing mode and is turned on in the reading mode; and sucking type seventh current source means (12-7) which is connected between the current mirror circuit (24) and the photodiode (22) through the fourth current switch (14-4) and which supplies a differential current ($I_{mw} - I_{mr}$) between a monitor current ($I_{mw}$) corresponding to the write power ($P_r$) and a monitor current ($I_{mr}$) corresponding to the read power ($P_r$).

13. A control apparatus of a laser diode comprising:

a laser diode (10) in which a cathode is connected to the ground side of a positive power source and an anode is connected to the plus voltage side of the positive power source through a control circuit and whose light emission is driven;

disgorging type first current source means (12-1) for supplying a current ($I_e$) corresponding to an erase power ($P_e$) to the laser diode (10):

sucking type second current source means (12-2) which is connected between the first current source means and the laser diode through a first current switch (14-1) that is turned off in an erasing mode and which supplies a differential current ($I_e - I_r$) between the current ($I_e$) corresponding to the erase power ($P_e$) and a current ($I_r$) corresponding to a read power ($P_r$);

sucking type third current source means (12-3) which is connected between the first current source means (12-1) and the laser diode (10) through a second current switch (14-2) that is turned on in a reading mode and which supplies a differential current ($I_r - I_{th}$) between the current ($I_r$) corresponding to the read power ($P_r$) and a current ($I_{th}$) corresponding to the zero power;

monitor means (16) for monitoring a light emitting power of the laser diode (10) and for generating a monitor signal corresponding to the erase power ($P_e$) in any of the erasing mode and the reading mode; and automatic light emitting power control means (18) for controlling the output current ($I_e$) of the first current source means (12-1) on the basis of a difference signal between the monitor signal returned from the monitor means (16) and a preset erase power reference signal.

14. A control apparatus according to claim 13, wherein said monitor means (16) comprises:

a photodiode (22) to monitor a light amount of the laser diode (10);

a PNP type current mirror circuit (24) for generating a current, as a monitor current, corresponding to a light reception current flowing in the photodiode (22);

a fourth current switch (14-4) which is turned off in the erasing mode and is turned on in the reading mode; and sucking type seventh current source means (12-7) which is connected between the current mirror circuit (24) and the photodiode (22) through the fourth current switch (14-4) and which supplies a differential current ($I_{me} - I_{mr}$) between a monitor current ($I_{me}$) corresponding to the erase power ($P_e$) and a monitor current ($I_{mr}$) corresponding to the read power ($P_r$).

15. An optical disk apparatus for optically recording and reproducing information by a control of a laser beam to a medium, comprising:

a laser diode (10) in which a cathode is connected to the ground side of a positive power source and an anode is connected to the plus voltage side of the positive power source through a control circuit;

disgorging type first current source means (12-1) for supplying a current ($I_w$) corresponding to a write power ($P_w$) to said laser diode;

sucking type second current source means (12-2) which is connected between the first current source means (12-1) and the laser diode (10) through a first current switch (14-1) that is turned on/off in accordance with write data in a writing mode and which supplies a differential current ($I_w - I_r$) between the current ($I_w$) corresponding to the write power ($P_w$) and a current ($I_r$) corresponding to a read power ($P_r$);

monitor means (16) for monitoring a light emitting power of the laser diode and for generating a monitor signal corresponding to the read power ($P_r$) in any of the automatic light emitting power control means for controlling an output current ($I_w$) of the first current source means (12-1) on the basis of a difference signal between the monitor signal returned from said monitor means (16) and a preset read power reference signal.

16. An optical disk apparatus according to claim 15, further comprising:

sucking type third current source means (12-3) which is connected between the first current source means (12-1) and the laser diode (10) through a second current switch (14-2) that is turned on in the reading mode and which supplies a differential current ($I_r - I_{th}$) between the current ($I_r$) corresponding to the read power ($P_r$) and a current ($I_{th}$) corresponding to the zero power; and modulating means (20) for modulating an emitted light of the laser diode (10) at a frequency higher than a frequency in the case of write data in the reading mode.

17. An optical disk apparatus according to claim 16, wherein said modulating means (20) comprises:

disgorging type fourth current source means (12-4) which is connected between the first current source means (12-1) and the laser diode (10) and which supplies a current ($I_{hfm}$) in which an average value of a high frequency modulating power is equal to the read power ($P_r$); and a sucking type fifth current source means (12-5) which is connected between the first current source means (12-1) and the laser diode (10) through a third current switch (14-3) that is turned on in the writing mode or the erasing mode and is turned on/off by a frequency signal of a frequency higher than a frequency in the case of the write data in the reading mode and which supplies the current ($I_{hfm}$) in which an average value of a high frequency modulating power is equal to the read power ($P_r$).

18. An optical disk apparatus according to claim 16, wherein said modulating means (20) comprises:

sucking type fifth current source means (12-5) for supplying a current ($I_{hfm}$) in which an average value of a high frequency modulating power is equal to the read power ($P_r$); and a third current switch (14-3) which is turned off in the writing mode or the erasing mode and is turned on/off by a frequency signal of a frequency higher than a frequency in the case of the write data in the reading mode, and wherein said fifth current source means (12-5) is connected in an AC manner between the first current source means (12-1) and the laser diode (10) through the third current switch (14-3) and a capacitor ($C_1$).

19. An optical disk apparatus according to claim 15, wherein said monitor means (16) comprises:

a photodiode (22) to monitor a light amount of the laser diode (10);

a PNP type current mirror circuit (24) to generate a current, as a monitor current, corresponding to a light reception current flowing in the photodiode (22);

disgorging type sixth current source means (12-6) which is connected between the current mirror circuit (24) and the photodiode (22) and which supplies a differential current ($I_{mw} - I_{mr}$) between a monitor current ($I_{mw}$) corresponding to the write power ($P_w$) and a monitor current ($I_{mr}$) corresponding to the read power ($P_r$); and sucking type seventh current source means (12-7) which is connected between the current mirror circuit (24) and the photodiode (22) through a fourth current switch (14-4) that is turned off in the writing mode or the erasing mode and is turned on in the reading mode and which supplies the differential current ($I_{mw} - I_{mr}$) between the monitor current ($I_{mw}$) corresponding to the write power ($P_w$) and the monitor current ($I_{mr}$) corresponding to the read power ($P_r$).

20. An optical disk apparatus for optically recording and reproducing information by a control of a laser beam to a medium, comprising:

a laser diode (10) in which a cathode is connected to the ground side of a positive power source and an anode is connected to the plus voltage side of the positive power source through a control circuit;

disgorging type first current source means (12-1) for supplying a current ($I_e$) corresponding to an erase power ($P_e$) to the laser diode (10);

sucking type second current source means (12-2) which is connected between said first current source means and the laser diode through a first current switch (14-1) that is turned off in an erasing mode and which supplies a differential current ($I_e - I_r$) between the current ($I_e$) corresponding to the erase power ($P_e$) and a current ($I_r$) corresponding to a read power ($P_r$);

monitor means (16) for monitoring a light emitting power of the laser diode (10) and for generating a monitor signal corresponding to the read power ($P_r$) in any of the erasing mode and a reading mode; and automatic light emitting power control means (18) for controlling the current ($I_e$) of said first current source means (12-1) on the basis of a difference signal between the monitor signal returned from the monitor means (16) and a preset read power reference signal.

21. An optical disk apparatus according to claim 20, further comprising:

sucking type third current source means (12-3) which is connected between the first current source means (12-1) and the laser diode (10) through a second current switch (14-2) that is turned on in the reading mode and which supplies a differential current ($I_r - I_{th}$) between a current ($I_r$) corresponding to the read power ($P_r$) and a current ($I_{th}$) corresponding to the zero power; and modulating means (20) for modulating an emitted light of the laser diode (10) at a frequency higher than a frequency in the case of the write data in the reading mode.

22. An optical disk apparatus according to claim 21, wherein said modulating means (20) comprises:

disgorging type fourth current source means (12-4) which is connected between the first current source means (12-1) and the laser diode (10) and which supplies a current ($I_{hfm}$) in which an average value of a high frequency modulating power is equal to the read power ($P_r$); and sucking type fifth current source means (12-5) which is connected between the first current source means (12-1) and the laser diode (10) through a third current switch (14-3) that is turned on in the writing mode or the erasing mode and is turned on/off by a frequency signal of a frequency higher than a frequency in the case of the write data in the reading mode and which supplies the current ($I_{hfm}$) in which the average value of the high frequency modulating power is equal to the read power ($P_r$).

23. An optical disk apparatus according to claim 21, wherein said modulating means (20) comprises:

sucking type fifth current source means (12-5) for supplying a current ($I_{hfm}$) in which an average value of a high frequency modulating power is equal to the read power ($P_r$); and a third current switch (14-3) which is turned off in the writing mode or the erasing mode and is turned on/off by a frequency signal of a frequency higher than a frequency in the case of the write data in the reading mode, and wherein said fifth current source means (12-5) is connected in an AC manner between the first current source means (12-1) and the laser diode (10) through the third current switch (14-3) and a capacitor ($C_1$).

24. An optical disk apparatus according to claim 20, wherein said monitor means (16) comprises:

a photodiode (22) to monitor a light amount of the laser diode (10);

a PNP type current mirror circuit (24) to generate a current, as a monitor current, corresponding to a light reception current flowing in the photodiode (22);

disgorging type sixth current source means (12-6) which is connected between said current mirror circuit (24) and the photodiode (22) and which supplies a differential current ($I_{mw} - I_{mr}$) between a monitor current ($I_{mw}$) corresponding to a write power ($P_w$) and a monitor current ($I_{mr}$) corresponding to the read power ($P_r$); and sucking type seventh current source means (12-7) which is connected between the current mirror circuit (24) and the photodiode (22) through a fourth current switch (14-4) that is turned off in the writing mode or the erasing mode and is turned on in the reading mode and which supplies the differential current ($I_{mw} - I_{mr}$) between the monitor current ($I_{mw}$) corresponding to the write power ($P_w$) and the monitor current ($I_{mr}$) corresponding to the read power ($P_r$).

25. An optical disk apparatus for optically recording and reproducing information by a control of a laser beam to a medium, comprising:

a laser diode (10) in which a cathode is connected to the ground side of a positive power source and an anode is connected to the plus voltage side of the positive power source through a control circuit and whose light emission is driven;

disgorging type first current source means (12-1) for supplying a current ($I_w$) corresponding to a write power ($P_w$) to the laser diode (10);

sucking type second current source means (12-2) which is connected between the first current source means (12-1) and the laser diode (10) through a first current switch (14-1) that is turned on/off in accordance with write data in a writing mode and which supplies a differential current ($I_w - I_r$) between the current ($I_w$) corresponding to the write power ($P_w$) and a current ($I_r$) corresponding to a read power ($P_r$);

sucking type third current source means (12-3) which is connected between the first current source means (12-1) and the laser diode (10) through a second current switch (14-2) that is turned on in a reading mode and which supplies a differential current ($I_r - I_{th}$) between the current ($I_r$) corresponding to the read power ($P_r$) and a current ($I_{th}$) corresponding to the zero power;

monitor means (16) for monitoring a light emitting power of the laser diode (10) and for generating a monitor signal corresponding to the write power ($P_w$) in any of the writing mode and the reading mode; and automatic light emitting power control means (18) for controlling the output current ($I_w$) of the first constant current source means (12-1) on the basis of a difference signal between the monitor signal returned from the monitor means (16) and a preset write power reference signal.

26. An optical disk apparatus according to claim 25, wherein said monitor means (16) comprises:

a photodiode (22) to monitor a light amount of the laser diode (10);

a PNP type current mirror circuit (24) to generate a current, as a monitor current, corresponding to a light reception current flowing in the photodiode (22);

a fourth current switch (14-4) which is turned off in the writing mode and is turned on in the reading mode; and sucking type seventh current source means (12-7) which is connected between the current mirror circuit (24) and the photodiode (22) through the fourth current switch (14-4) and which supplies a differential current ($I_{mw} - I_{mr}$) between a monitor current ($I_{mw}$) corresponding to the write power ($P_r$) and a monitor current ($I_{mr}$) corresponding to the read power ($P_r$).

27. An optical disk apparatus for optically recording and reproducing information by a control of a laser beam to a medium, comprising:

a laser diode (10) in which a cathode is connected to the ground side of a positive power source and an anode is connected to the plus voltage side of the positive power source through a control circuit and whose light emission is driven;

disgorging type first current source means (12-1) for supplying a current ($I_e$) corresponding to an erase power ($P_e$) to the laser diode (10);

sucking type second current source means (12-2) which is connected between the first current source means and the laser diode through a first current switch (14-1) that is turned off in an erasing mode and which supplies a differential current $(I_e - I_r)$ between the current $(I_e)$ corresponding to the erase power $(P_e)$ and a current $(I_r)$ corresponding to a read power $(P_r)$;

sucking type third current source means (12-3) which is connected between the first current source means (12-1) and the laser diode (10) through a second current switch (14-2) that is turned on in a reading mode and which supplies a differential current $(I_r - I_{th})$ between the current $(I_r)$ corresponding to the read power $(P_r)$ and a current $(I_{th})$ corresponding to the zero power;

monitor means (16) for monitoring a light emitting power of the laser diode (10) and for generating a monitor signal corresponding to the erase power $(P_e)$ in any of the erasing mode and the reading mode; and automatic light emitting power control means (18) for controlling the current $(I_e)$ of the first current source means (12-1) on the basis of a difference signal between the monitor signal returned from the monitor means (16) and a preset erase power reference signal.

28. An optical disk apparatus according to claim 27, wherein said monitor means (16) comprises:

a photodiode (22) to monitor a light amount of the laser diode (10);

a PNP type current mirror circuit (24) for generating a current, as a monitor current, corresponding to a light reception current flowing in the photodiode (22);

a fourth current switch (14-4) which is turned off in the erasing mode and is turned on in the reading mode; and sucking type seventh current source means (12-7) which is connected between the current mirror circuit (24) and the photodiode (22) through the fourth current switch (14-4) and which supplies a differential current $(I_{me} - I_{mr})$ between a monitor current $(I_{me})$ corresponding to the erase power $(P_e)$ and a monitor current $(I_{mr})$ corresponding to the read power $(P_r)$.

* * * * *